US012763438B2

(12) United States Patent
Jeong et al.

(10) Patent No.: US 12,763,438 B2
(45) **Date of Patent: *Oct. 13, 2026**

(54) BATTERY MODULE AND BATTERY PACK INCLUDING THE SAME

(71) Applicant: LG Energy Solution, Ltd., Seoul (KR)

(72) Inventors: Jee Hoon Jeong, Daejeon (KR); Junyeob Seong, Daejeon (KR); Kitaek Jung, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 842 days.

This patent is subject to a terminal disclaimer.

(21) Appl. No.: 17/428,155

(22) PCT Filed: May 11, 2020

(86) PCT No.: PCT/KR2020/006155
§ 371 (c)(1),
(2) Date: Aug. 3, 2021

(87) PCT Pub. No.: WO2020/262819
PCT Pub. Date: Dec. 30, 2020

(65) Prior Publication Data

US 2022/0029250 A1 Jan. 27, 2022

(30) Foreign Application Priority Data

Jun. 25, 2019 (KR) ........................ 10-2019-0075825

(51) Int. Cl.
*H01M 50/509* (2021.01)
*H01M 10/04* (2006.01)
(Continued)

(52) U.S. Cl.
CPC ..... *H01M 50/509* (2021.01); *H01M 10/0413* (2013.01); *H01M 10/0481* (2013.01);
(Continued)

(58) Field of Classification Search
CPC ......... H01M 10/0413; H01M 10/0481; H01M 10/617; H01M 10/6555; H01M 10/6557;
(Continued)

(56) References Cited

U.S. PATENT DOCUMENTS 6,087,036 A * 7/2000 Rouillard .......... H01M 10/6555 429/66
9,786,875 B2 10/2017 Juventin et al.
(Continued)

FOREIGN PATENT DOCUMENTS

CN 103904254 A 7/2014
CN 204732459 U 10/2015
(Continued)

OTHER PUBLICATIONS

Search Report dated Nov. 25, 2022 from the Office Action for Chinese Application No. 202080013082.7 issued Dec. 2, 2022, pp. 1-2. [See p. 2, categorizing the cited references].
(Continued)

*Primary Examiner* — Lingwen R Zeng
(74) *Attorney, Agent, or Firm* — Lerner David LLP

(57) ABSTRACT

A battery module includes a first cell stack and a second cell stack each including one or more battery cells, a mono frame receiving the first cell stack and the second cell stack, a spring located between the first cell stack and the second cell stack, a first plate located between the first cell stack and the spring, and a second plate located between the second cell stack and the spring, and a compression direction of the spring is parallel to a stack direction of the one or more battery cells in the first cell stack and of the one or more battery cells in the second cell stack.

7 Claims, 4 Drawing Sheets

(51) Int. Cl.

| | |
|---|---|
| ***H01M 10/6557*** | (2014.01) |
| ***H01M 50/204*** | (2021.01) |
| *H01M 10/617* | (2014.01) |
| *H01M 10/6555* | (2014.01) |
| *H01M 50/211* | (2021.01) |
| *H01M 50/289* | (2021.01) |
| *H01M 50/505* | (2021.01) |

(52) U.S. Cl.
CPC ..... *H01M 10/6557* (2015.04); *H01M 50/204* (2021.01); *H01M 10/617* (2015.04); *H01M 10/6555* (2015.04); *H01M 50/211* (2021.01); *H01M 50/289* (2021.01); *H01M 50/505* (2021.01); *Y02E 60/10* (2013.01); *Y02P 70/50* (2015.11)

(58) Field of Classification Search
CPC ............. H01M 50/204; H01M 50/211; H01M 50/289; H01M 50/505; H01M 50/509; Y02E 60/10; Y02P 70/50
See application file for complete search history.

(56) References Cited

U.S. PATENT DOCUMENTS

| | | | | |
|---|---|---|---|---|
| 9,929,384 | B2 | 3/2018 | Le-Gall et al. | |
| 2012/0045686 | A1 | 2/2012 | Jung | |
| 2012/0129038 | A1 | 5/2012 | Lim et al. | |
| 2012/0258337 | A1* | 10/2012 | Wang | B60L 58/18 429/50 |
| 2014/0363711 | A1 | 12/2014 | Zhao | |
| 2015/0132634 | A1* | 5/2015 | Sera | H01M 10/625 429/153 |
| 2016/0248060 | A1 | 8/2016 | Brambrink et al. | |
| 2017/0098855 | A1 | 4/2017 | Karditsas et al. | |
| 2018/0062127 | A1 | 3/2018 | Lee et al. | |
| 2018/0076487 | A1 | 3/2018 | Lee et al. | |
| 2018/0183119 | A1 | 6/2018 | Ju et al. | |
| 2019/0001838 | A1 | 1/2019 | Choi et al. | |
| 2019/0041273 | A1 | 2/2019 | Shimoda et al. | |
| 2019/0131671 | A1 | 5/2019 | Lorenz et al. | |
| 2019/0363392 | A1 | 11/2019 | Kim et al. | |
| 2019/0366875 | A1 | 12/2019 | Hong et al. | |
| 2020/0153058 | A1* | 5/2020 | Shimazaki | H01M 50/291 |
| 2020/0243817 | A1* | 7/2020 | Kwak | H01M 50/211 |
| 2021/0126313 | A1* | 4/2021 | Lee | H01M 50/262 |
| 2021/0320374 | A1* | 10/2021 | Lee | H01M 10/6566 |

FOREIGN PATENT DOCUMENTS

| | | | |
|---|---|---|---|
| CN | 105308770 | A | 2/2016 |
| CN | 107078311 | A | 8/2017 |
| CN | 108603792 | A | 9/2018 |
| CN | 207938744 | U | 10/2018 |
| CN | 109075406 | A | 12/2018 |
| CN | 109428107 | A | 3/2019 |
| CN | 208781901 | U | 4/2019 |
| CN | 109844996 | A | 6/2019 |
| DE | 102014219609 | A1 | 3/2016 |
| JP | 2018522376 | A | 8/2018 |
| KR | 100805152 | B1 | 2/2008 |
| KR | 101173870 | B1 | 8/2012 |
| KR | 101470072 | B1 | 12/2014 |
| KR | 20160065149 | A | 6/2016 |
| KR | 20180025643 | A | 3/2018 |
| KR | 101853526 | B1 | 4/2018 |
| KR | 20180091441 | A | 8/2018 |
| KR | 101933086 | B1 | 3/2019 |
| KR | 20190031831 | A | 3/2019 |
| KR | 101953362 | B1 | 5/2019 |
| WO | 2017055158 | A1 | 4/2017 |

OTHER PUBLICATIONS

International Search Report for Application No. PCT/KR2020/006155 mailed Aug. 31, 2020, pp. 1-2.
Search Report dated May 31, 2023 from the Office Action for Chinese Application No. 202080013082.7 issued Jun. 3, 2023, pp. 1-2. [See p. 1-2, categorizing the cited references].
Extended European Search Report including Written Opinion for Application No. 20831809.7 dated Jan. 27, 2022, pp. 1-7.

* cited by examiner

BATTERY MODULE AND BATTERY PACK INCLUDING THE SAME

CROSS-REFERENCE TO RELATED APPLICATIONS

This application is a national phase entry under 35 U.S.C. § 371 of International Application No. PCT/KR2020/006155, filed on May 11, 2020, published in Korean, which claims the benefit of Korean Patent Application No. 10-2019-0075825 filed on Jun. 25, 2019 with the Korean Intellectual Property Office, the disclosures of which are incorporated herein by reference in their entireties.

TECHNICAL FIELD

The present disclosure relates to a battery module and a battery pack including the same, and more particularly, to a battery module having a cell stack in which one or more battery cells are stacked, and a battery pack including the same.

BACKGROUND ART

In modern society, as portable devices such as a mobile phone, a notebook computer, a camcorder and a digital camera has been daily used, the development of technologies in the fields related to mobile devices as described above has been activated. In addition, rechargeable secondary batteries are used as a power source for an electric vehicle (EV), a hybrid electric vehicle (HEV), a plug-in hybrid electric vehicle (P-HEV) and the like, in an attempt to solve air pollution and the like caused by existing gasoline vehicles using fossil fuel, and therefore, there is an increasing need for development of the secondary battery.

Currently commercialized secondary batteries include a nickel cadmium battery, a nickel hydrogen battery, a nickel zinc battery, and a lithium secondary battery. Among them, the lithium secondary battery has come into the spotlight because they have advantages, for example, hardly exhibiting memory effects compared to nickel-based secondary batteries and thus being freely charged and discharged, and having very low self-discharge rate and high energy density.

Such lithium secondary battery mainly uses a lithium-based oxide and a carbonaceous material as a positive electrode active material and a negative electrode active material, respectively. The lithium secondary battery includes an electrode assembly in which a positive electrode plate and a negative electrode plate respectively coated with the positive electrode active material and the negative electrode active material are disposed with a separator being interposed between them, and an exterior material, i.e., battery case, which seals and accommodates the electrode assembly together with an electrolyte.

Generally, the lithium secondary battery may be classified into a can-type secondary battery in which the electrode assembly is embedded in a metal can, and a pouch-type secondary battery in which the electrode assembly is embedded in a pouch of an aluminum laminate sheet, depending on the shape of the exterior material.

In the case of a secondary battery used for a small-sized device, two to three battery cells are arranged, but in the case of a secondary battery used for a medium- to large-sized device such as an automobile, a battery pack in which a large number of battery cells are electrically connected is used. This battery pack usually includes a plurality of secondary batteries, and the plurality of secondary batteries are connected to each other in series and in parallel to enhance the capacity and output. Further, the one or more battery modules may be mounted together with various control and protection systems such as a battery management system (BMS), a cooling system, and the like to form a battery pack.

In this case, it is necessary to minimize an assembly tolerance between the battery cells forming the cell stack for a compact configuration of the cell stack.

In addition, the battery cells have characteristics which expand and contract when the battery cells are charged and discharged, and a device that can effectively alleviate the expansion is necessary.

DETAILED DESCRIPTION OF THE INVENTION

Technical Problem

Embodiments of the present disclosure are designed to solve the problems as described above, and therefore, an object of the present disclosure is to provide a battery module that can minimize an assembly tolerance between battery cells and also effectively alleviate expansion of the battery cell.

However, the problem to be solved by the embodiments of the present disclosure is not limited to the above-described problems, and can be variously expanded within the scope of the technical idea included in the present disclosure.

Technical Solution

In accordance with an aspect of the present disclosure, there is provided a battery module including a first cell stack and a second cell stack each including one or more battery cells, a mono frame receiving the first cell stack and the second cell stack, a spring located between the first cell stack and the second cell stack, a first plate located between the first cell stack and the spring, and a second plate located between the second cell stack and the spring, and a compression direction of the spring is parallel to a stack direction of the one or more battery cells in the first cell stack and of the one or more battery cells in the second cell stack.

The one or more battery cells in the first cell stack and the one or more battery cells in the second cell stack may be stacked in an upright or inverse form to be parallel to opposing side surfaces of the mono frame.

A thermistor may be located at least one of between the first cell stack and the first plate and between the second cell stack and the second plate.

At least one of the first plate and the second plate may include a heat transfer member.

The mono frame may have a front surface and a rear surface, which are opened.

The spring may include two or more springs.

The spring may be a cylindrical spring.

The battery module may further include a busbar frame received in the mono frame together with the first cell stack and the second cell stack, and the busbar frame may be located on an upper side of the first cell stack and on an upper side of the second cell stack.

The spring may be bonded to the first plate and the second plate by an adhesive agent.

Advantageous Effects

According to the embodiments of the present disclosure, an assembly tolerance between battery cells can be minimized by applying a spring to the interior of the battery module, and a pressure applied to a module frame can be reduced by effectively alleviating an expansion of the battery cells.

Further, a thermistor can be disposed at a location that is advantageous in measuring temperature to more effectively detect or prevent heating of the battery cell.

DETAILED DESCRIPTION OF THE EMBODIMENTS

Figure 1:
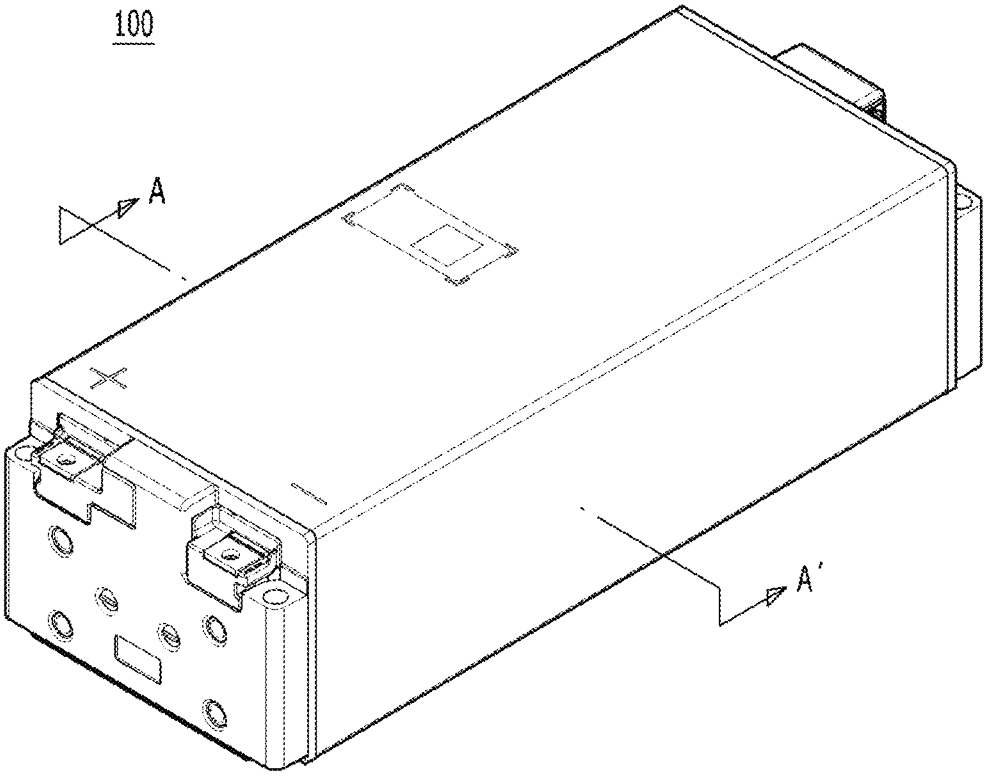
FIG. 1 is a perspective view illustrating a battery module according to an embodiment of the present disclosure.

Hereinafter, various embodiments of the present disclosure will be described in detail with reference to the accompanying drawings so that those skilled in the art can easily implement them. The present disclosure may be modified in various different ways, and is not limited to the embodiments set forth herein.

Parts that are irrelevant to the description will be omitted to clearly describe the present disclosure, and like reference numerals designate like elements throughout the specification.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity. In the drawings, for convenience of description, the thicknesses of some layers and regions are exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed on the upper end of the reference portion toward the opposite direction of gravity.

Further, throughout the specification, when a part is referred to as "including" a certain component, it means that it can further include other components, without excluding the other components, unless otherwise stated.

Figure 2:
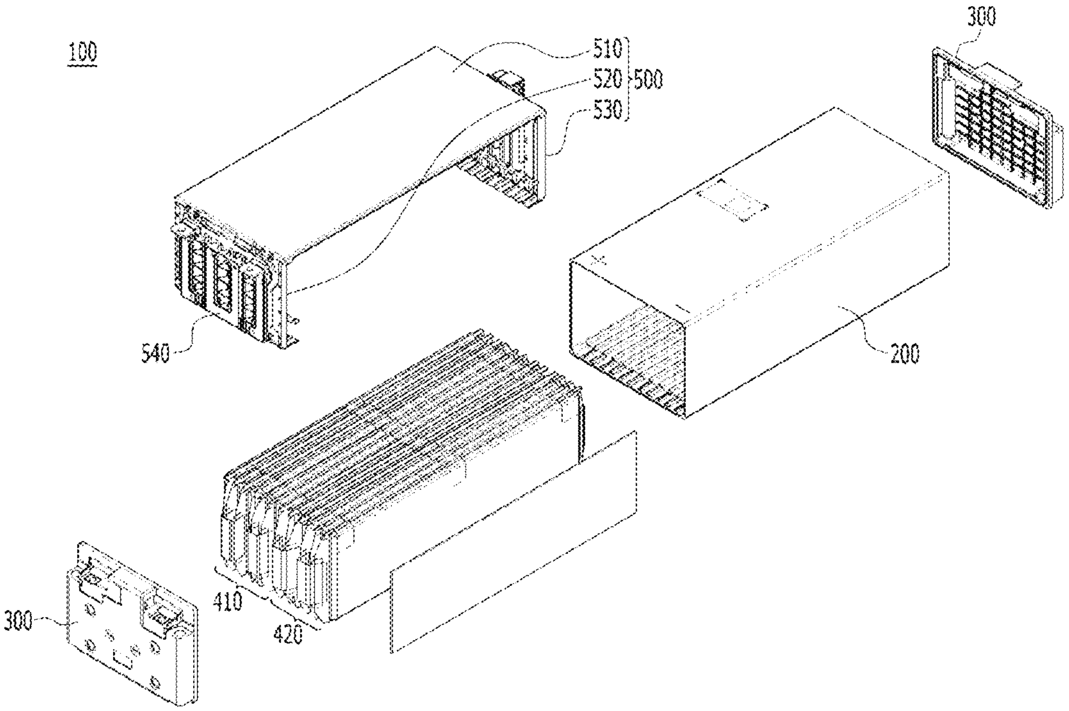
FIG. 2 is an exploded perspective view illustrating the battery module of FIG. 1.
Figure 3:
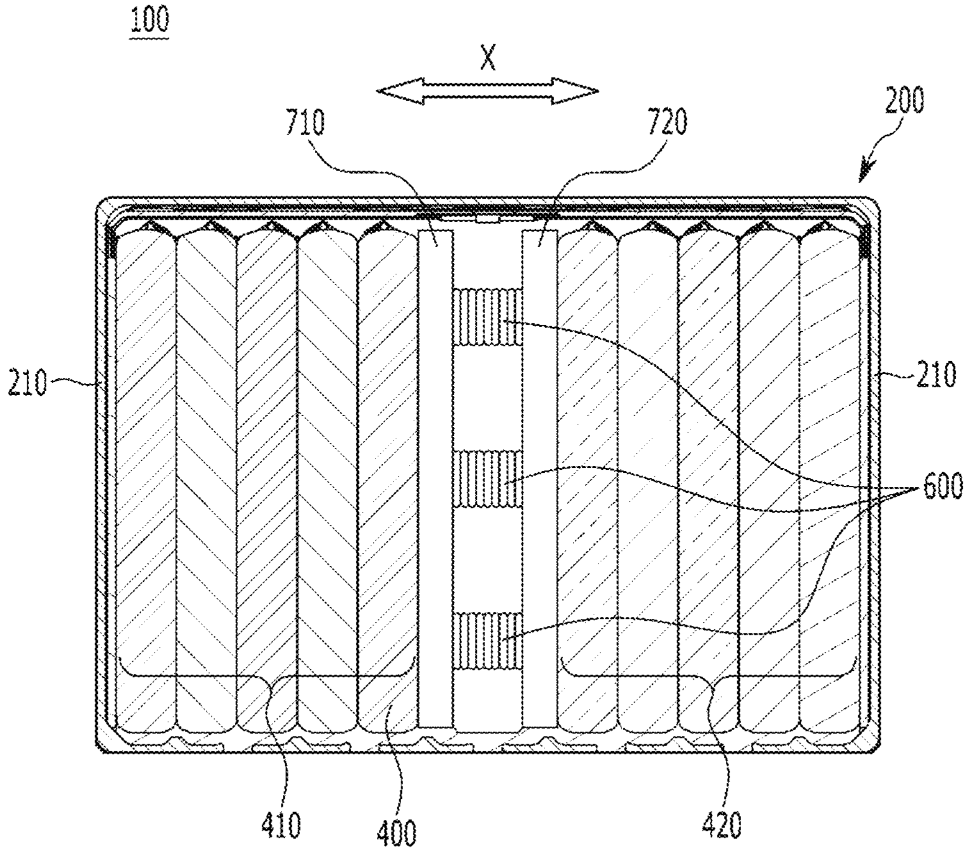
FIG. 3 is a sectional view taken along cutting line A-A of FIG. 1.

FIG. 1 is a perspective view illustrating a battery module 100 according to an embodiment of the present disclosure. FIG. 2 is an exploded perspective view illustrating the battery module 100 of FIG. 1. FIG. 3 is a sectional view taken along cutting line A-A of FIG. 1.

Referring to FIGS. 1 to 3, the battery module 100 according to the embodiment of the present disclosure includes a first cell stack 410, a second cell stack 420, a mono frame 200 receiving the first cell stack 410 and the second cell stack 420, a spring 600 located between the first cell stack 410 and the second cell stack 420, a first plate 710 located between the first cell stack 410 and the spring 600, and a second plate 720 located between the second cell stack 420 and the spring 600. Each of the first cell stack 410 and the second cell stack 420 may include one or more battery cells 400, but it is preferable that two or more the battery cells 400 are included.

The compression direction of the spring 600 is parallel to the stack direction (the X direction) of the battery cells 400 that constitute the first cell stack 410 and the second cell stack 420. Then, the battery cells 400 are stacked in an upright or inverse form to be parallel to both side surfaces 210 of the mono frame 200. It is preferable that the spring 600 is disposed such that the compression direction of the spring is perpendicular to both side surfaces 210 of the mono frame 200.

Through the above-mentioned configuration, the battery cells 400 can be fixed in the battery module 100 as the spring 600 attaches the battery cells 400, whereby an assembly tolerance between the battery cells 400 or between the battery cells 400 and the mono frame 200 can be effectively alleviated.

Further, the spring 600 may effectively absorb expansion of the battery cells 400 that may be caused when the battery cells are charged and discharged, thereby alleviating a stress applied to the mono frame 200.

Meanwhile, in the present embodiment, the spring 600 does not directly contact the first cell stack 410 and the second cell stack 420, but first plate 710 and the second plate 720 are individually disposed therebetween. Further, the spring 600 may be bonded to the first plate 710 and the second plate 720 by an adhesive agent to fix the spring 600 in the battery module 100. The form of the spring 600 is not limited, but it is preferable that it is a cylindrical spring.

Through the first plate 710 and the second plate 720, the elastic force of the spring 600 may be uniformly applied to the first cell stack 410 and the second cell stack 420 without concentrating on portions thereof.

Further, in a process of receiving the first cell stack 410 and the second cell stack 420 in the mono frame 200, the first cell stack 410 and the second cell stack 420 are inserted into the mono frame 200 in a state in which the spring 600 is compressed by applying a force thereto, and the first cell stack 410 and the second cell stack 420 may be fixed to the interior of the mono frame 200 by the elastic force of the spring 600. That is, the first cell stack 410 and the second cell stack 420 may be more easily received in the mono frame 200.

Meanwhile, it is preferable that two or more the springs 600 are disposed between the first plate 710 and the second plate 720 to be spaced apart from each other at an equal interval. This is because the elastic force of the spring 600 can be prevented from concentrating on portions of the first cell stack 410 and the second cell stack 420.

Figure 4:
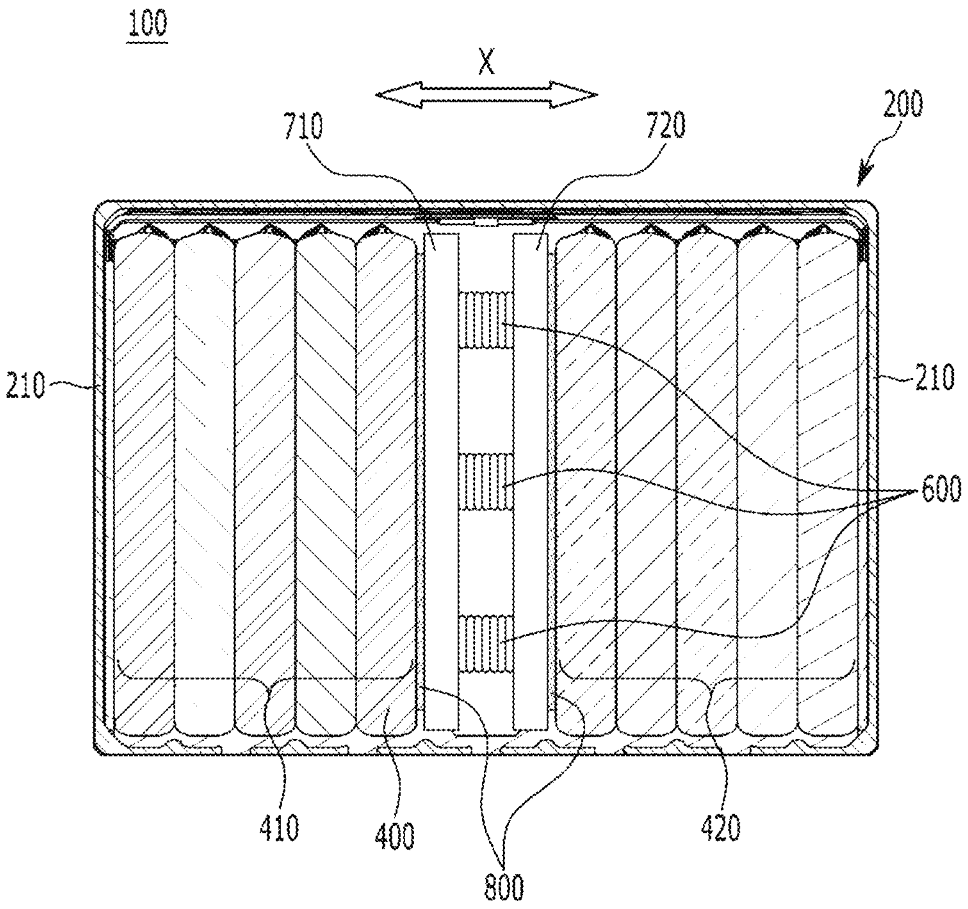
FIG. 4 is a section view illustrating a battery module according to another embodiment of the present disclosure.

FIG. 4 is a section view illustrating a battery module 100 according to another embodiment of the present disclosure. Referring to FIG. 4, a thermistor may be disposed in the battery module 100 of the present embodiment.

In detail, the thermistor 800 may be located at least one of between the first cell stack 410 and the first plate 710 and between the second cell stack 420 and the second plate 720. In particular, it is preferable that the thermistor 800 is located both between the first cell stack 410 and the first plate 710 and between the second cell stack 420 and the second plate 720 as illustrated in FIG. 4. The thermistor 800 may be bonded to the battery cells of the first cell stack 410 and the second cell stack 420 through an adhesive agent.

The thermistor 800 is disposed close to the battery cell 400 and may be also attached to the battery cell 400 by the elastic force of the spring 600, whereby the safety of the battery module 100 can be advantageously secured because the heat generated by the battery cells 400 may be more easily detected.

Meanwhile, at least one of the first plate 710 and the second plate 720 of the present embodiment may include a heat transfer member. Because the first plate 710 and the second plate 720 include the heat transfer member, a temperature deviation in the battery module 100 can be reduced by diffusing heat locally generated by the battery cells 400. Further, the heat generated by the battery cells 400 is easily discharged to a space between the first plate 710 and the second plate 720.

Referring to FIG. 2 again, the battery module 100 according to the present embodiment may further include a busbar frame 500 received in the mono frame 200 together with the first cell stack 410 and the second cell stack 420.

The busbar frame 500 may include a upper frame 510 located on the upper side of the first and the second cell stacks 410 and 420, a front surface frame 520 located on front surfaces of the first and the second cell stacks 410 and 420, and a rear surface frame 530 located on rear surfaces of the first and the second cell stacks 410 and 420, and a busbar 540 connected to electrode leads of the battery cells constituting the first and the second cell stacks 410 and 420 may be mounted on the front surface frame 520 and the rear surface frame 530.

The mono frame 200 may be a metal plate having an opened front surface and an opened rear surface, and the first cell stack 410, the second cell stack 420, and the busbar frame 500 may be received into the front surface and the second surface, which are opened.

The battery module above-mentioned may be applied to various devices in the form of the battery module or a battery pack including the battery module. The devices may include transportation means such as an electric bike, an electric vehicle, and a hybrid electric vehicle, and the like, but the present disclosure is not limited thereto but may be applied to various devices that may use a secondary battery.

Although the preferred embodiments of the present disclosure have been described in detail above, the scope of the present disclosure is not limited thereto, and various modifications and improvements of those skilled in the art using the basic concepts of the present disclosure defined in the following claims also belong to the scope of rights.

DESCRIPTION OF REFERENCE NUMERALS

100: battery module
200: mono frame
300: end plate
410: first cell stack
420: second cell stack
600: spring
710: first plate
720: second plate

The invention claimed is:

1. A battery module comprising:

a first cell stack and a second cell stack each including one or more battery cells;

a mono frame receiving the first cell stack and the second cell stack;

a spring located between the first cell stack and the second cell stack;

a first plate located between the first cell stack and the spring;

a second plate located between the second cell stack and the spring; and a busbar frame received in the mono frame together with the first cell stack and the second cell stack, wherein at least one of the first plate and the second plate comprises a heat transfer member, wherein the spring is coupled to the first plate and the second plate by an adhesive agent, wherein the busbar frame includes an upper frame located on the upper sides of the first cell stack and the second cell stack, a front surface frame located on front surfaces of the first cell stack and the second cell stack, and a rear surface frame located on rear surfaces of the first cell stack and the second cell stack, wherein a compression direction of the spring is parallel to a stack direction of the one or more battery cells in the first cell stack and of the one or more battery cells in the second cell stack, wherein the mono frame is a single plate extending continuously so as to surround the first and second cell stacks and has an opened front surface and an opened rear surface, and the first cell stack, the second cell stack, and the busbar frame are received into the opened front surface and the opened rear surface of the mono frame, wherein the first cell stack and the second cell stack are configured to be received in the mono frame where the spring is in a compressed state, wherein a thermistor is located at least one of between the first cell stack and the first plate and between the second cell stack and the second plate in the stack direction, so as to directly contact the one or more battery cells, and wherein the thermistor is attached to the one or more battery cells by an elastic force of the spring.

2. The battery module of claim 1, wherein the one or more battery cells in the first cell stack and the one or more battery cells in the second cell stack are stacked in an upright or inverse form to be parallel to opposing side surfaces of the mono frame.

3. The battery module of claim 1, wherein the spring comprises two or more springs.

4. The battery module of claim 1, wherein the spring is a cylindrical spring.

5. A battery pack comprising one or more of the battery modules of claim 1.

6. The battery module of claim 1, wherein the one or more battery cells of the first cell stack includes two or more battery cells, and the one or more battery cells of the second cell stack includes two or more battery cells.

7. The battery module of claim 1, wherein the battery module consists of the first cell stack and the second cell stack, wherein the spring consists of three springs spaced equidistantly apart from each other, wherein the spring is a cylindrical spring, and wherein the thermistor contacts a majority of a side surface of an innermost cell of the one or more battery cells along the stack direction.

* * * * *